United States Patent [19]

Kennel

[11] Patent Number: 4,573,695
[45] Date of Patent: Mar. 4, 1986

[54] SLED APPARATUS

[76] Inventor: Gordon H. Kennel, Box 1794, Havre, Mont. 59501

[21] Appl. No.: 605,114

[22] Filed: Apr. 30, 1984

[51] Int. Cl.[4] .................. B62B 13/16; B62B 13/18
[52] U.S. Cl. ........................................ 280/20; 280/8
[58] Field of Search ............... 280/20, 30, 9, 12 S, 280/39, 8; 108/131, 132, 133

[56] References Cited

U.S. PATENT DOCUMENTS

| | | | |
|---|---|---|---|
| 938,300 | 10/1909 | Coleman | 280/20 |
| 1,030,170 | 6/1912 | Evans | 280/20 |
| 2,472,920 | 6/1949 | Peenstra | 280/20 |
| 3,912,290 | 10/1975 | Rich | 280/20 |

FOREIGN PATENT DOCUMENTS 182831  5/1936  Switzerland ............ 280/20

Primary Examiner—Joseph F. Peters, Jr.
Assistant Examiner—Joseph G. McCarthy
Attorney, Agent, or Firm—Arthur L. Urban

[57] ABSTRACT

Sled apparatus including a body supporting portion, a runner portion, a runner supporting portion and a steering portion; the body supporting portion including an elongated frame section with rigid longitudinal edges and front and rear ends, the frame section including two generally quadrangular members disposed in an end to end relationship and pivotally connected to one another; the runner portion including a runner disposed below and spaced from each longitudinal edge of the frame section, each runner including forward and rear runner sections selectively connectable in an end to end relationship when the quadrangular members are disposed in a single plane; the runner supporting portion including a plurality of spacer sections each having one end pivotally connected to a longitudinal edge and an opposite end rigidly affixed to a runner section, the spacer sections affixed to each forward runner section being disposed remote from the front end of the frame section, pivotal cross members joining spacer sections that extend from opposite longitudinal edges of the frame section; the steering portion including a transverse bar member pivotally connected to the front end of the frame section at the center thereof, connector bars each having one end pivotally connected to a free end of each forward runner section adjacent the front end of the frame section, the connector bars extending to one another with adjacent ends being pivotally connected to a central rearward extension of the transverse bar member.

14 Claims, 8 Drawing Figures

SLED APPARATUS

This invention relates to a novel sled apparatus and more particularly relates to a new sled apparatus that can be stored in a small space.

Sleds have been used throughout history to move loads from one place to another. Originally, sleds were makeshift structures that were constructed at the time a person needed to transfer a load. Such primitive structures would be used for the immediate task and then discarded.

As civilization developed, sleds were used on a more regular basis. Sleds were built that could withstand continued use for a long period of time. At the time horses were employed to pull wagons with heavy loads, it was customary to employ sleds in the winter in place of the wagons when the snow was so deep that wagons would bog down.

In recent years with the development of motor vehicles, horse drawn sleds and wagons were replaced with trucks. Thus, sleds were used almost exclusively as a recreational item for the sport of sledding both by children and adults.

The trend toward greater and greater participation in outdoor activities such as hunting, backpacking and the like has created a new demand for sleds. The outdoorsman needs to haul supplies to remote areas that are only accessible on foot. Similarly, a hunter has to pack out game that he has killed. Also, if a member of a hunting or backpacking party is injured or becomes ill, it is necessary to provide a means for bringing the persons out of the wilderness to a hospital.

One of the considerations, however, in selecting items to be included in the supplies for an expedition into the wilderness is the weight and space that will be taken by each item. Too heavy or large a load can cause the packers to become exhausted before the destination is reached. Thus, backpackers and hunters always attempt to reduce the size and weight of their load to a minimum. There is a tendency for backpackers to eliminate items that may not be needed and instead only carry essentials. A sled may be considered a non-essential item by many packers.

It is only after an outdoorsman has encountered a situation in which he or she has needed a sled and did not have one that the importance of a sled is fully realized. Since many sportsmen have been in such situations, there is an increasing effort to find a lightweight sled that can be carried in a small space and which still will provide a means for successfully moving a person, animal or other load to and/or from a remote area without injury and in a convenient manner.

The present invention provides a novel sled apparatus with features and advantages not found in previous sleds. The sled apparatus of the invention is light in weight and taken up little space in storage. The sled can be carried by backpackers conveniently and easily.

The sled apparatus of the invention can be prepared for use quickly by persons of all ages after only a minimum of instruction. The sled can be converted into a thin flat configuration for carrying and storage just as easily.

The sled apparatus of the invention is simple in design and relatively inexpensive to produce. The sled can be fabricated from commercially available materials and components. Conventional industrial techniques and procedures and semi-skilled labor can be utilized in its manufacture.

The sled apparatus is durable in construction and can take abuse. The sled has a long useful life with little, if any, maintenance being required to keep the sled in good working condition.

These and other benefits and advantages of the novel sled apparatus of the present invention will be apparent from the following description and the accompanying drawings in which.

Figure 1:
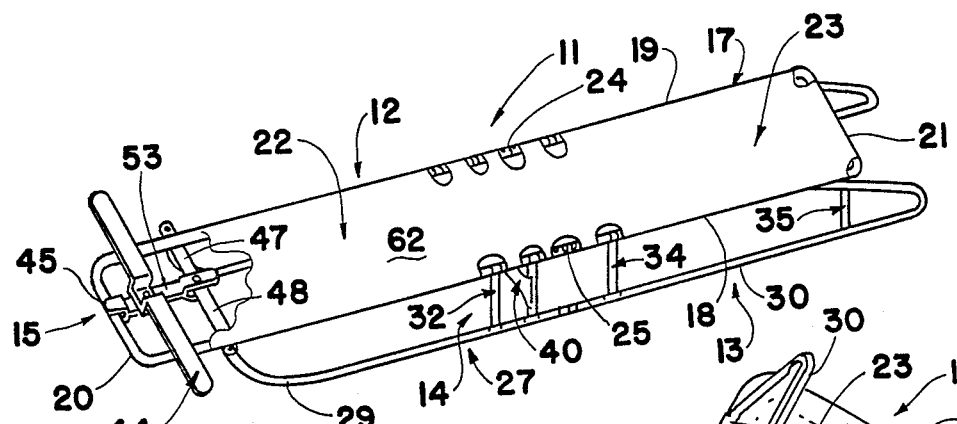
FIG. 1 is a view in perspective of one form of the sled apparatus of the invention.
Figures 2, 3:
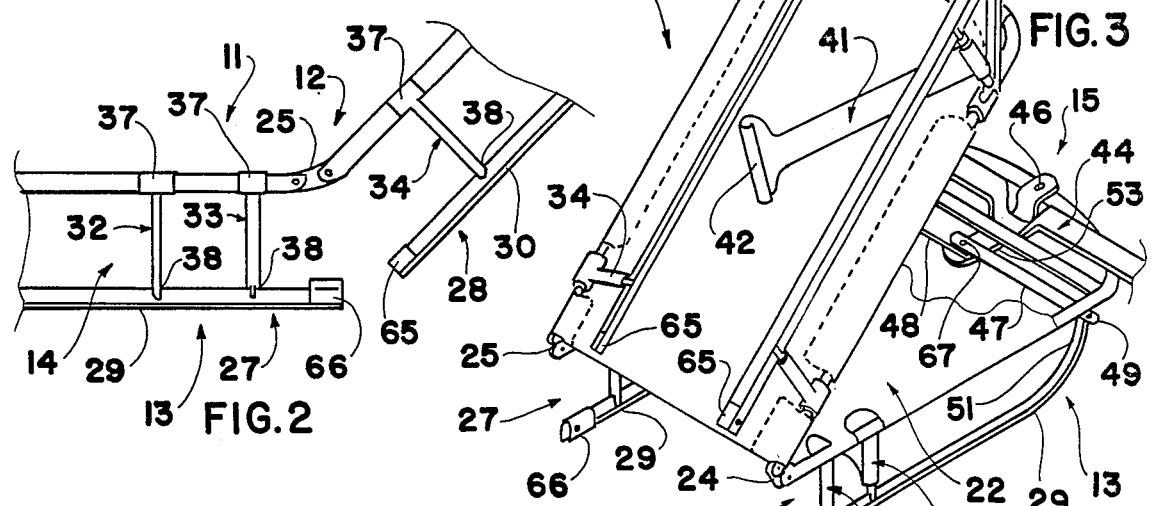
FIG. 2 is a fragmentary side view of the sled apparatus shown in FIG. 1.
FIG. 3 is a view in perspective from the rear of the sled apparatus shown in FIG. 1 with components partially folded.

As shown in the drawings, one form of the novel sled apparatus 11 of the present invention includes a body supporting portion 12, a runner portion 13, a runner supporting portion 14 and a steering portion 15.

The body supporting portion 12 of the sled apparatus 11 of the invention includes an elongated frame section 17. The frame section 17 includes longitudinal edges 18 and 19, a front end 20 and a rear end 21. The frame section 17 includes rigid peripheral edges. The frame section 17 advantageously includes a peripheral frame with a flexible material such as canvas or another fabric stretched therebetween.

The frame section 17 includes two generally quadrangular members 22 and 23. The quadrangular members 22 and 23 are disposed in an end to end relationship and pivotally connected to one another. The pivotal connection of the quadrangular members preferably is through hinge means and especially through hinges 24 and 25 disposed along the longitudinal edges 18 and 19.

The runner portion 13 of the sled apparatus 11 includes runners 27 and 28 disposed below and spaced from each longitudinal edge of the frame section 17. The runners 27 and 28 extend substantially the full length of the frame section. Each runner includes forward and rear sections 29 and 30 that are selectively engageable or connectable in an end to end relationship when the quadrangular members 22 and 23 are disposed in a single plane as shown in FIG. 1.

The runners 27 and 28 advantageously extend upwardly to the front end 20 of the frame section. Preferably, the runners also extend upwardly to the rear end 21 of the frame section.

The runner supporting portion 14 of the sled apparatus 11 includes a plurality of spacer sections 32, 33, 34 and 35. The spacer sections 32–35 extend between the runner sections 29 and 30 and the longitudinal edges 18 and 19 of the frame section.

Each of the spacer sections has one end 37 pivotally connected to a longitudinal edge 18 or 19. The opposite end 38 of each spacer section is rigidly affixed to a runner section. Advantageously, the spacer sections are bar members.

At least two spacer sections are affixed to each of the runner sections. Thus, spacers 32 and 33 are affixed to the forward runner sections 29 and spacers 34 and 35 are affixed to the rear runner sections 30. The spacer sections 32 and 33 affixed to each forward runner section 29 are disposed remote from the front end 20 of the frame section 17.

Cross members 40 and 41 join the spacer sections that extend from opposite longitudinal edges of the frame section 17. Each cross member is pivotally connected to one of the joined spacer sections. The opposite end of the cross member is selectively engageable with the other of the joined spacers. This may be accomplished through an arcuate end section 42 which wraps around the spacer. The cross members 40 and 41 advantageously are disposed intermediate the frame section 17 and the runners 27 and 28.

The steering portion 15 of the sled apparatus 11 of the invention includes a transverse bar member 44. The transverse bar member 44 is disposed adjacent the front end 20 of the frame section 17. The transverse bar member is disposed symmetricaly with respect to the longitudinal edges 18 and 19 of the frame section. The transverse bar 44 is pivotally connected to the front end 20 of the frame section at the center 45 thereof through a bolt or pin 46.

The transverse bar member 44 advantageously extends beyond the longitudinal edges of the frame section. Preferably, the transverse bar is selectively separable from the frame section. This reduces the size of the folded sled.

Connector bars 47 and 48 each have one end 49 and 50 respectively pivotally connected to a front end 51 of each forward runner section 29. The connector bars extend to one another, advantageously in a generally straight line. The adjacent ends 52 of the connector bars 47 and 48 are pivotally connected to a central rearward extension 53 of the transverse bar member 44.

Figure 6:
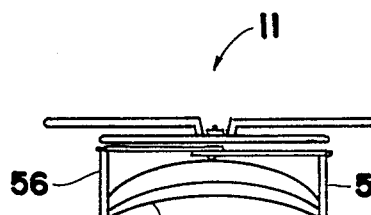
FIG. 6 is a view from the rear of the sled apparatus of the invention with a lower support member.
Figure 7:
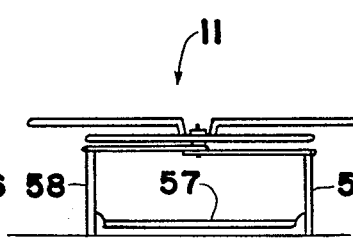
FIG. 7 is a view from the rear of sled apparatus of the invention with another support member.
Figure 8:
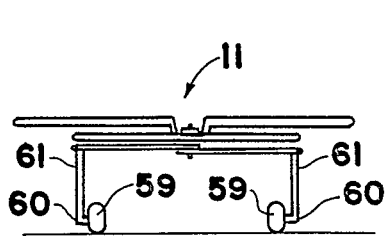
FIG. 8 is a view from the rear of the sled apparatus of the invention with wheels.

To facilitate movement of a loaded sled apparatus 11 through deep snow, it is advantageous to include support means between the runners 27 and 28 below the frame section 17. The support means can take the form of a pan 55 as shown in FIG. 6. The pan 55 may be a curved sheet of aluminum or plastic that fits between runner spacers 56. Similarly, the support may be a wide ski-shaped wood, metal or plastic sheet 57 that is disposed between spacers 58.

To provide more extensive use of the sled apparatus 11 of the invention, it may be advantageous to provide wheels or casters 59. The wheels can be attached to runners 60 or spacers 61 so the sled can be used when there is no snow or ice.

The sled apparatus 11 of the present invention can be fabricated from one or more of a variety of different materials. Suitable materials include metals such as steel or aluminum, wood, plastics, combinations thereof and the like. Preferred construction may utilize a frame section with an aluminum peripheral frame, a canvas bed 62 stretched therebetween, and steel runners and spacers.

Figures 4, 5:
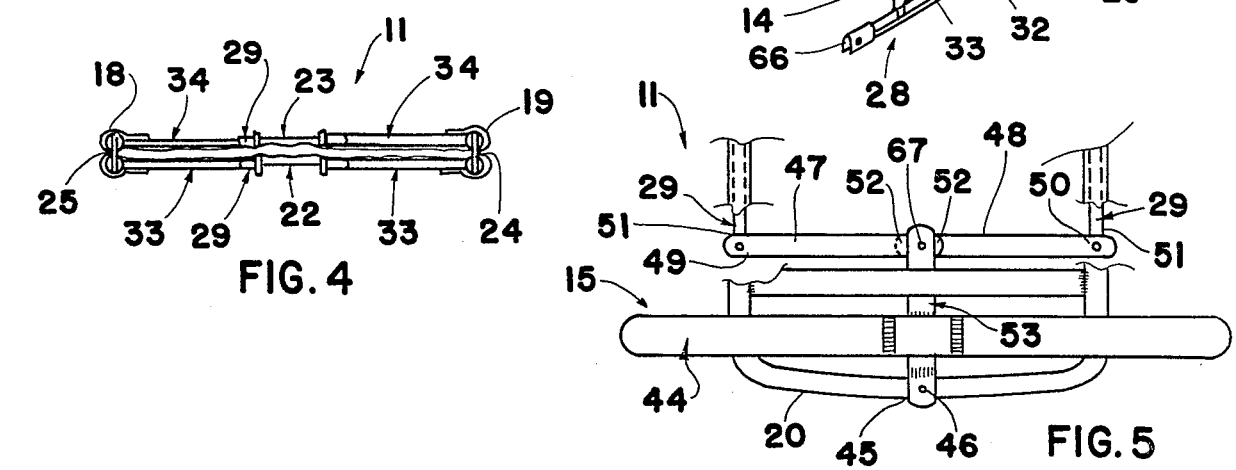
FIG. 4 is an edge view of the sled apparatus shown in FIG. 1 completely folded.
FIG. 5 is a fragmentary top view of the steering portion of the sled apparatus shown in FIG. 1.

In the use of the sled apparatus 11 of the invention as shown in the drawings, a folded sled 11 as shown in FIG. 4, is assembled by unfolding the quadrangular members 22 and 23 and pivoting them about hinges 24 and 25. Also, runner sections 29 and 30 on each longitudinal edge 18 and 19 are pivoted away from the members 22 and 23.

As the quadrangular members move close to a straight position, a male end 65 of runner section 30 is inserted into a female end 66 at the rear of the runner section 29. This interlocking of the runner sections on both runners 27 and 28 provides rigid continuous assemblies.

Thereafter, the cross members 40 and 41 are pivoted into transversely disposed positions to engage with the spacer section located opposite thereto on the other longitudinal edge. This disposition of the cross members and the interlocking of the runner sections provides a sled with a high degree of structural integrity that can withstand severe use and abuse.

The steering portion 15 is added to the basic sled structure by positioning the transverse bar member 44 along the front of the frame section 17. The bar member 44 is pivotally connected to the front end 20 of the frame section with a suitable bolt or pin 46. Then, connector bars 47 and 48 which are pivotally connected to the front end 51 of the runners are swung toward one another until they can be pivotally connected to a rearward extension 53 of the bar member 44. This also can be performed with a bolt or pin 67. The sled now is ready for use.

The sled apparatus can be used as a conventional sled for recreation of for carrying loads. For use in deep snow, it may be desirable to position a support pan 55 or a wide ski 57 below the frame section 17 between the runner spacers. This enables the sled to ride on top of the snow rather than sink into it and become mired. When snow or ice is lacking, wheels or casters 59 can be mounted under the sled to allow use on dry surfaces. When the sled no longer is needed, the sled can be folded again by performing the above assembly steps in reverse order.

The steering portion can be removed, if desired, and the cross members 40 and 41 swung out of the way. Then, the frame members 22 and 23 are folded against each other which separates the runner sections 29 and 30 so they can be folded back against the frame members. All of the assembly and disassembly steps can be accomplished easily and quickly after only a minimum of practice.

The folded sled apparatus 11 is a thin, flat package that can be stored easily in a small space. Alternatively, the folded sled can be included as part of a back pack to carry it into the back country or out of it.

The above description and the accompanying drawings show that the present invention provides a novel sled apparatus with features and advantages not found in previous sleds. The sled apparatus of the invention is light in weight and can be stored in a small space when folded. Also, the folded sled apparatus can be carried easily, especially by backpackers.

The sled apparatus of the invention can be used conveniently by persons of all ages, even those with limited strength. The sled apparatus is simple in design and can be produced relatively inexpensively. The sled can be manufactured from commercially available materials and components employing conventional fabricating techniques. The sled apparatus is durable in construction and can take abuses. The sled has a long useful life and requires little, if any, maintenance to keep it in good working condition.

It will be apparent that various modifications can be made in the particular sled apparatus described in detail above and shown in the drawings within the scope of the invention. The size, configuration and arrangement of components can be changed to meet specific requirements. Also, the body supporting portion can be fabricated of a variety of materials to provide good durability and/or a high degree of comfort. In addition, carrying handles or straps to hold the load in position can be employed if desired as well as other accessories. These and other changes can be made in the sled apparatus of the invention provided the functioning and operation thereof are not adversely affected. Therefore, the scope of the present invention is to be limited only by the following claims.

What is claimed is:

1. Sled apparatus including a body supporting portion, a runner portion, a runner supporting portion and a steering portion; said body supporting portion including an elongated frame section with longitudinal edges and front and rear ends, said frame section including rigid peripheral edges, said frame section including two generally quadrangular members, said quadrangular members being disposed in an end to end relationship and pivotally connected to one another; said runner portion including a runner disposed below and spaced from each longitudinal edge of said frame section, said runners extending substantially the full length of said frame section, each runner including forward and rear runner sections selectively connectable in an end to end relationship when said quadrangular members are disposed in a single plane; said runner supporting portion including a plurality of spacer sections extending between said runner sections and said longitudinal edges of said frame section, each of said spacer sections having one end pivotally connected to a longitudinal edge and an opposite end rigidily affixed to a runner section, the spacer sections affixed to each forward runner section being disposed remote from said front end to said frame section, cross members joining spacer sections that extend from opposite longitudinal edges of said frame section, each cross member being pivotally connected to one of the joined spacer sections and being selectively engageable with the other of the joined spacer sections; said steering portion including a transverse bar member disposed adjacent said front end of said frame section symmetrically with respect to said longitudinal edges of said frame section, said transverse bar member being pivotally connected to said front end of said frame section at the center thereof, connector bars each having one end pivotally connected to a free end of each forward runner section adjacent said front end of said frame section, said connector bars extending to one another with adjacent ends being pivotally connected to a central rearward extension of said transverse bar member.

2. Sled apparatus according to claim 1 wherein said frame section includes a peripheral frame with a flexible material extending therebetween.

3. Sled apparatus according to claim 1 wherein said pivotal connection of said quadrangular members is through hinge means.

4. Sled apparatus according to claim 3 wherein said hinge means are disposed along said longitudinal edges of said frame section.

5. Sled apparatus according to claim 1 wherein said connection of said runner sections is through a male/female connection.

6. Sled apparatus according to claim 1 wherein said runners extend upwardly to said front end of said frame section.

7. Sled apparatus according to claim 1 wherein said runners extend upwardly to said rear end of said frame section.

8. Sled apparatus according to claim 2 wherein at least two spacer sections are affixed to each of said runner section.

9. Sled apparatus according to claim 1 wherein said spacer sections are bar members.

10. Sled apparatus according to claim 1 wherein said cross members are disposed intermediate said frame section and said frame.

11. Sled apparatus according to claim 1 wherein said transverse bar member of said steering portion extends beyond the longitudinal edges of said frame section.

12. Sled apparatus according to claim 1 wherein said transverse bar member is selectively separable from said frame section.

13. Sled apparatus according to claim 1 including support means disposed between said runners below said frame section.

14. Sled apparatus according to claim 1 including wheel means selectively connected to said sled apparatus.

* * * * *